July 30, 1963 H. KREIDEL, SR., ETAL 3,099,466
ROTARY PIPE COUPLING
Filed May 31, 1960 2 Sheets-Sheet 1
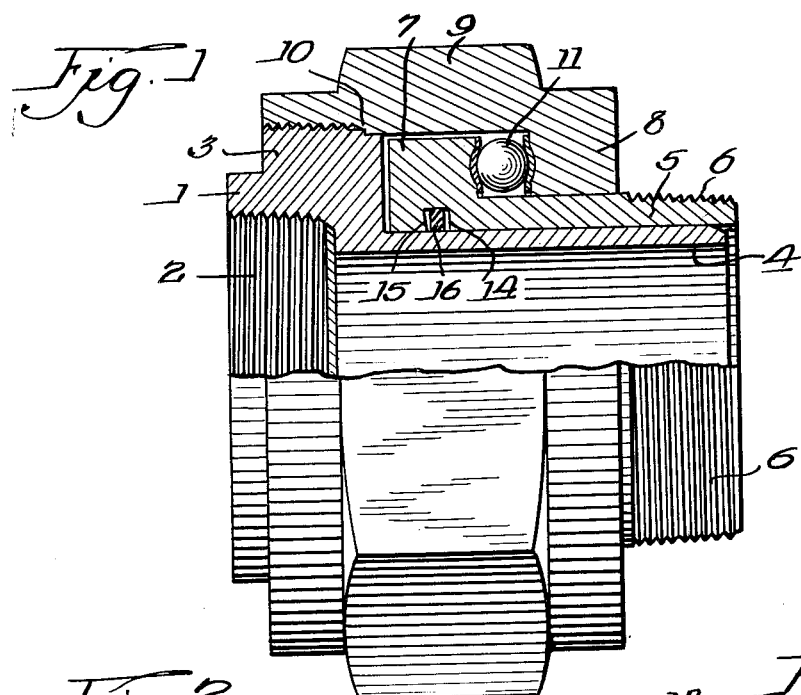
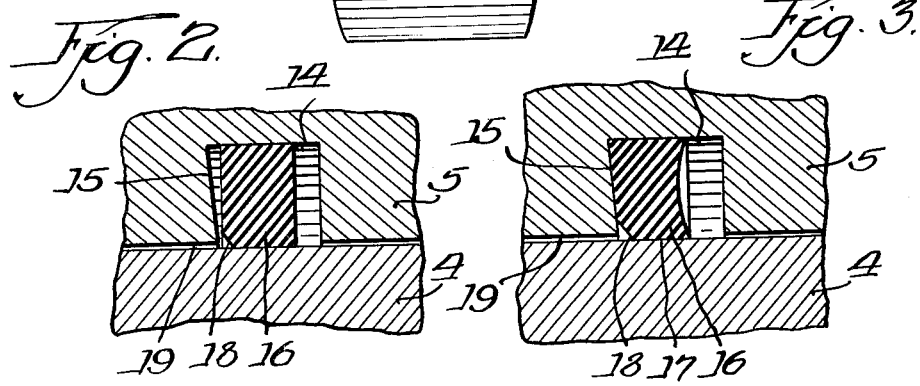
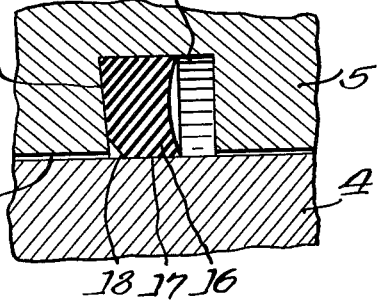
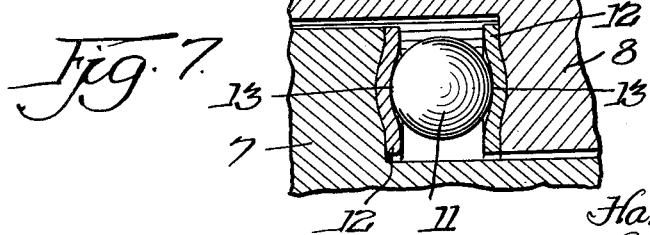
Inventors.
Hans Kreidel, Sr. &
Hans Kreidel, Jr.
By
Atty.

July 30, 1963   H. KREIDEL, SR., ETAL   3,099,466
ROTARY PIPE COUPLING
Filed May 31, 1960   2 Sheets-Sheet 2
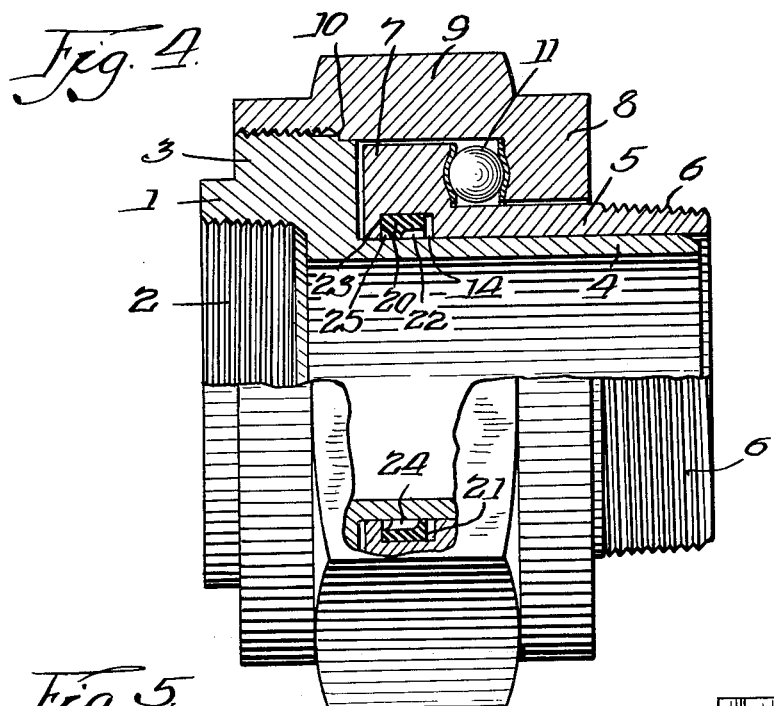
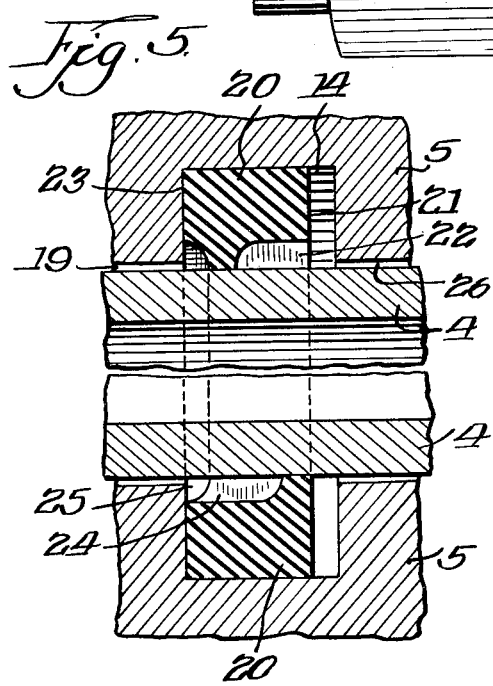
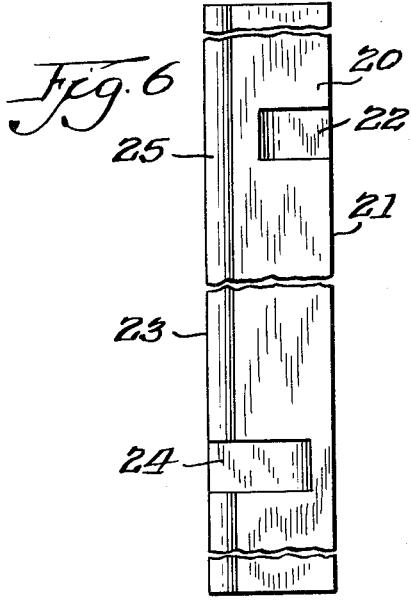
Inventors.
Hans Kreidel, Sr. &
Hans Kreidel, Jr.
By [signature] Atty.

3,099,466
Patented July 30, 1963

3,099,466
ROTARY PIPE COUPLING
Hans Kreidel, Sr., and Hans Kreidel, Jr., Wiesbaden, Germany, assignors to Inventex A.G., Kusnacht-Zurich, Switzerland, a company of Switzerland
Filed May 31, 1960, Ser. No. 33,012
Claims priority, application Germany June 19, 1959
3 Claims. (Cl. 285—98)

This invention is concerned with a rotary pipe coupling which is particularly suitable for hydraulics installations and adapted to execute rapid rotary and pendulous motions even when subjected to high pressure applied in continuous operation.

The rotary pipe coupling according to the invention comprises a male connecting member provided with an interior thread for connection thereof to a desired pressure line or conduit and having an exteriorly threaded radially extending enlargement and a smooth tubular guide extension projecting axially therefrom, and further comprising a tubular female connecting member which is rotatably seated upon said tubular guide extension of the male member throughout the length thereof and held in sealed engagement therewith by a sleeve nut disposed in firm threaded and centered engagement with the exterior thread on the radial enlargement of the male connecting member, the sleeve nut being provided with a radially inwardly extending shoulder and the female member being provided with a radially outwardly extending shoulder, and an axial thrust bearing being positioned between said shoulders. The axial extension of the male connecting member is sealed with respect to the female member by a sealing ring or packing disposed in a sealing chamber formed in the female connecting member, said packing in said chamber being effected by the pressure of the hydraulic medium. The sealing chamber is formed in the female member preferably near the end thereof from which extends the radially outwardly directed shoulder, as an interior cross-sectionally rectangular channel which is open in radially inward direction toward the tubular guide extension of the male member.

The packing which is positioned in the sealing chamber of the female member is advantageously a cross-sectionally rectangular or square packing ring which has initially an inner diameter corresponding to the outer diameter of the axial guide extension of the male member. The pressure of the hydraulic medium in the line or conduit including the pipe coupling effects deformation of the sealing or packing ring so as to provide with respect to the male member a piston-like seal, thereby also nearly completely relieving the bearing of the cooperating parts so that transverse stresses, such as may occur in the female member, are substantially prevented from effecting it.

This relieving action of the packing permits easy journal operation of the bearing with least wear thereof, thereby benefitting the intended sealing operation.

The positioning of the axial thrust bearing within the area of axial guide extension of the male member and the tubular female member rotatably seated thereon, contributes toward a short and compact structure for the entire pipe coupling.

The favorable journal properties of the pipe coupling or, rather to say, the favorable rotation characteristics thereof, can be further improved by forming at the packing a lubricating film provided by the medium conveyed under pressure in the conduit which includes the coupling. This lubricating film is in accordance with the invention obtained by the provision, in the sealing chamber, of a packing ring of cross-sectionally rectangular configuration having at least one lubricating groove on the side thereof which covers the annular gap between the axial guide extension of the male member and the female member, such groove extending from its respective ends and terminating short of the other end thereof.

These lubricating grooves can be formed in desired manner, for example, as developments of oblique planes which do not intersect, or in the form of grooves extending transverse to and especially perpendicularly to the packing plane. These grooves are in the latter case advantageously displaced by 180°. The medium flowing under pressure in the conduit including the coupling enters through the annular gap between the relatively rotating parts into the sealing chamber and permeates into at least one of the lubricating grooves which is in the packing open at the end surface thereof. A lubricating film is in this manner produced between the rotating parts of the pipe coupling, which is continuously maintained, securing sufficient lubrication without producing excess lubricant which would lead to unnecessary losses and contamination. The life of the sealing ring or packing is thus increased manifold as compared with known sealing means, thereby correspondingly prolonging the life of other points of wear and of the entire coupling.

The foregoing and other objects and features of the invention will appear from the description of embodiments thereof which will be rendered below with reference to the accompanying drawings.

FIG. 1 shows a pipe coupling according to the invention partially in sectional and partially in elevational view, in assembled position of the parts, but before pressure is applied;

FIGS. 2 and 3 show the parts on a larger scale, in fractional view with the sealing ring or packing in the sealing chamber appearing in sectional view before and after pressure is effective thereon;

FIG. 4 is a part sectional and part elevational view of a pipe coupling corresponding to the one shown in FIG. 1 but employing a modified sealing ring or packing;

FIG. 5 shows parts of FIG. 4 including the packing on an enlarged scale, in sectional view;

FIG. 6 illustrates a developed view of the inner portion of the packing ring of FIG. 5; and FIG. 7 represents details of the axial thrust bearing of the device in cross-sectional view.

As will be seen from FIGS. 1 and 4, the rotary pipe coupling comprises a relatively stationary male connecting member 1 which is provided with an internal thread 2 for connecting it to a desired body, for example, a pipe or a connecting conduit (not shown). The male connecting member is provided with a radial enlargement 3 carrying an external thread and has a tubular guide extension 4. The female member 5 is rotatably journalled on the guide extension 4 substantially over the entire length thereof, and is provided at the free end with an external thread 6 for connecting it to a desired pipe (not shown) while carrying at the inner end a shoulder 7.

A sleeve nut 9 is employed for threaded engagement with the enlargement 3 on the male member 1 for holding the latter in assembly with the female member 5. The sleeve nut 9 is provided with a radially inwardly directed shoulder 8 forming with the radially outwardly directed shoulder 7 of the female connecting member 5 an annular space in which is disposed an axial thrust ball bearing 11. Such ball bearing satisfactorily absorbs all axial pressure forces resulting in operation from the action of the medium flowing in the conduit in which the coupling is inserted; the tubular axially directed guide and journal extension 4 of the male connecting member 1 is at the same time with growing pressure of the flowing medium to a far reaching extent relieved of transversely effective forces, thus securing at all times easy rotation of the female member without having to overcome any particular function. The sleeve nut 9 is threaded onto the male connecting member up to the stop shoulder 10 which serves in this manner for the axial adjustment of the axial thrust bearing as well as for the centering of the parts. As illustrated in FIGS. 1 and 4, the adjustment is such that a slight amount of clearance exists between the opposed faces of the radial enlargement 3 and the shoulder 7, whereby sufficient movement may be effected between the members to provide a pressure relief on the bearing as a result of applied forces on the female member by the flowing medium.

As illustrated in FIG. 7, the axial thrust bearing comprises two hard or hardened annular steel disks 12 preferably provided, by stamping or the like, with ball race depressions 13, such disks being seated in the correspondingly shaped mutually facing walls of the shoulders 7 and 8. The balls and the ball races are in this manner properly centered.

The sealing with respect to the medium flowing under pressure in the conduit including the pipe coupling is effected with the aid of the sealing chamber 14 which is formed as an annular channel along the inner wall of the female connecting member 5 within the area of the shoulder 7 which extends radially outwardly therefrom, such channel or chamber being open radially inwardly in the direction of the axially directed guide extension 4 of the male connecting member 1.

In the embodiment illustrated in FIGS. 1 to 3, the sealing channel or chamber is of cross-sectionally substantially rectangular configuration with the side wall 15 facing away from the pressure force somewhat undercut as shown. The sealing ring or packing 16 to be disposed in the sealing chamber 14 is cross-sectionally substantially rectangular, its inner and outer walls lying in the absence of pressure, as shown in FIGS. 1 and 2, respectively in engagement with the outer wall of the axial guide extension 4 of the male member and the bottom wall of the sealing chamber 14. The pressure exerted on the packing 16 by the medium flowing in the conduit including the coupling, which permeates through the juncture between the guide extension 4 of the male member 1 and the female member 5, deforms the packing 16, such packing accordingly establishing piston-like intimate engagement with the bottom wall of the sealing chamber or channel (which may also be referred to as a sealing recess) as well as with the side wall 15 and the outside of the male guide extension 4, thereby providing for these parts a tight seal. FIG. 3 shows the packing 16 in this pressure condition. It will be seen that the packing attaches closely to the undercut wall 15, thereby providing for a pressure distribution which relieves the surface 17 of the tubular male extension 4, thereby securing the tight sealing seat of the packing with little wear of the packing material. The packing ring is as illustrated slightly bevelled at 18 to prevent entry of parts thereof into the juncture 19 between the parts 5 and 4.

The sealing chamber (channel or recess) 14 in the embodiment according to FIGS. 4–6 contains a packing (sealing ring) 20 of different configuration. This packing is cross-sectionally rectangular and, as is particularly apparent from FIG. 5, is provided in its sealing face with a lubricating groove 22 extending from the end 21 and with a lubricating groove 24 extending from the end 23. The respective lubricating grooves are mutually displaced by 180° and terminate short of the respectively oppositely extending ends of the packing.

The operation of the packing is as follows:

The medium which is being conveyed in the conduit including the present pipe coupling seeps through the annular gap at the juncture of the parts 4 and 5, such gap being shown in FIG. 5 on a greatly enlarged scale, thus entering the sealing chamber 14 and reaching the packing 20 where it enters into the lubricating groove 22, thereby forming incident to the relative rotation of the parts a lubricating film on the outer surface of the male part 4 which is continuously supplemented and maintained. The lubricating groove 24 extending from the other side 23 of the packing wipes over this lubricating film, carrying small amounts thereof along and distributing them upon the remainder of the outer surface of the male part 4. The lubricating film thus extends over the entire width of the packing 20, reducing frictional losses and considerably extending the life of the packing and therewith the life of the entire coupling.

This packing, the relative dimensions and relationship of which, with respect to other parts, are shown in FIGS. 5 and 6 on a greatly enlarged scale, provides a further advantage. The packing, at the side 23 which faces away from the direction in which the pressure is applied, is arcuately recessed as indicated at 25 to prevent in the presence of pressure wedging of the material thereof into the juncture 19 between the parts, which would lead to damaging the packing and reducing its useful life.

Changes may be made within the scope and spirit of the appended claims which define what is believed to be new and desired to have protected by Letters Patent.

We claim:

1. A rotary pipe coupling for connecting a pair of conduits in a conduit system conveying a medium under pressure wherein at least one of said conduits is capable of axial movement, comprising a tubular male member having a passage therethrough and means formed thereon for connecting it to a conduit part and having a radially outwardly directed externally threaded enlargement and a tubular guide portion extending axially outwardly therefrom, a tubular female member rotatably journalled upon said tubular guide portion substantially through the length thereof, and having a radially outwardly directed flange-like shoulder disposed in assembled position adjacent to said enlargement and axially spaced therefrom by an axial clearance therebetween and means formed adjacent the outer end thereof for connecting said female member to said axially movable conduit, a sleeve nut threadedly attached to said enlargement of said male member and having a radially inwardly directed flange-like shoulder disposed axially outwardly of and spaced from said flange-like shoulder of said female member, an axial thrust bearing disposed between said flange-like shoulders, said female member being axially movable relative to said male member whereby thrust forces on said thrust bearing may be relieved, said female member having a chamber formed therein interiorly thereof opposite said tubular guide portion along the area of the flange-like shoulder, said tubular guide portion and said female member having an annular gap therebetween communicating with said passage at a point axially outwardly of said chamber, and a packing disposed in said chamber and engaging said tubular guide portion to provide a seal between the male and female members, said packing having an axially outwardly facing surface exposed to the pressure of said medium within said annular gap, said female member being biased axially inwardly away from said thrust bearing to effect a relief of the thrust forces thereon by said pressure acting upon said axially outwardly facing surface.

2. A rotary pipe coupling according to claim 1, wherein said chamber is a cross-sectionally substantially rectangular shape, said packing being an annular member with cross-sectionally substantially rectangular configuration, at least one interior lubricating groove being formed in the sealing face of said packing extending from each side for only part of the width thereof, said axial thrust bearing comprising rolling elements disposed between bearing races which are respectively seated in said flange-like shoulders.

3. A rotary pipe coupling according to claim 1, wherein said chamber is of cross-sectionally substantially rectangular shape with the side wall thereof which faces in the direction of the radially outwardly directed enlargement of said male member diverging radially inwardly of such chamber, said packing being an annular member of cross-sectionally substantially rectangular configuration with the inner diameter thereof corresponding substantially to the outer diameter of said tubular axially extending guide portion of said male member.

References Cited in the file of this patent

UNITED STATES PATENTS

| | | |
|---|---|---|
| 1,151,334 | Bell | Aug. 24, 1915 |
| 1,326,064 | Keller | Dec. 23, 1919 |
| 1,369,592 | White | Feb. 22, 1921 |
| 1,638,224 | Vandergrift | Aug. 9, 1927 |
| 2,632,659 | Lee | Mar. 24, 1953 |
| 2,657,825 | Erickson | Nov. 3, 1953 |
| 2,833,568 | Corsette | May 6, 1958 |

FOREIGN PATENTS

| | | |
|---|---|---|
| 708,142 | Great Britain | Apr. 28, 1954 |